July 8, 1958 I. E. BERGER Re. 24,498

PIVOTAL-SLIDING DOOR CABINET

Original Filed March 29, 1956

INVENTOR.

Irvin E. Berger

BY Silverman, Mullin & Cass

ATT'YS

United States Patent Office

Re. 24,498
Reissued July 8, 1958

24,498

PIVOTAL-SLIDING DOOR CABINET

Irvin E. Berger, Chicago, Ill., assignor to Premier-Hall Manufacturing Co., Chicago, Ill., a corporation Original No. 2,763,527, dated September 18, 1956, Serial No. 574,820, March 29, 1956. Application for reissue November 12, 1957, Serial No. 696,003

8 Claims. (Cl. 312—325)

Matter enclosed in heavy brackets [ ] appears in the original patent but forms no part of this reissue specification; matter printed in italics indicates the additions made by reissue.

The present disclosure is concerned with a novel resiliently yieldable hinge structure which functions to mount a door on a cabinet and afford sufficient yieldability during a door closing operation to relieve the forces tending normally to resist initial closing movement. [The structure includes] *The invention is also concerned with* means to slidably mount one vertical side edge of the door on the cabinet front wall for horizontal reciprocal movement therealong and a hinge leaf or panel that is hingedly connected along one of its vertical edges to the cabinet front wall and along its opposed vertical edge to a resiliently yieldable bracket or spring leaf secured firmly to the back face of the door inwardly of the point midway between its vertical edges. When the door is in closed position it lies in a plane parallel to the cabinet front wall. When in fully open position the door is perpendicularly inclined thereto and the hinge leaf likewise is perpendicularly inclined to the cabinet front wall but in an opposed direction relative to the angle of the door so as to form, when viewed in plan, a triangle having as its sides the door, the hinge leaf, and the cabinet wall.

In order to start the door into a closed position, pressure is applied against the outermost free vertical edge area of the door from the front side so as to cause the slidably mounted edge to move in a horizontal direction. Initial movement in a door closing operation is resisted by the opposing force of the hinge leaf, which is angularly disposed relative to the plane of the open door, and by the friction of the slidable mounting. This resistance is overcome in the instant disclosure by providing a resiliently yieldable connection between the link and the door, which absorbs the initial thrust against the hinge leaf while permitting the angle of the door relative to the plane of the cabinet front wall to be decreased, said door swinging about the axis of its hingedly mounting edge. It is, therefore, an object of the invention to provide such a slidable hinge mounting for a door.

Another object of the invention is to provide a door with a resiliently yieldable hinge element secured firmly thereto and connected with a hinge leaf.

Another novel feature of the present invention resides in the arrangement whereby the [resiliently yieldable] hinge element is secured to the door at a point located inwardly of the midway point between the opposite vertical door edges, thereby reducing the manual force required to be exerted when closing the door.

*Another object of the invention is to provide a pivotal-sliding door cabinet in which there is a novel link connection between door and cabinet to prevent binding during sliding of the door edge.*

Another object of the invention is to provide a cabinet having an opening in its front wall that is closed by a rugged [novelly constructed] *novel* slidable hinge door or doors which is inexpensive to manufacture, is rigidly assembled, is positive in its operation and simple to operate.

With the foregoing and other objects in view which will appear as the description proceeds, the invention consists of certain novel features of construction, arrangement and combination of parts hereinafter fully described, illustrated in the accompanying drawings, and particularly pointed out in the appended claims, it being understood that various changes in the form, proportion, size and minor details of the structure may be made without departing from the spirit or sacrificing any of the advantages of the invention.

For the purpose of facilitating an understanding of my invention, I have illustrated in the accompanying drawings a preferred embodiment thereof, from an inspection of which, when considered in connection with the following description, my invention, its mode of construction, assembly and operation, and many of its advantages should be readily understood and appreciated.

Referring to the drawings in which the same characters of reference are employed to indicate corresponding or similar parts throughout the several figures of the drawings.

Figure 1:
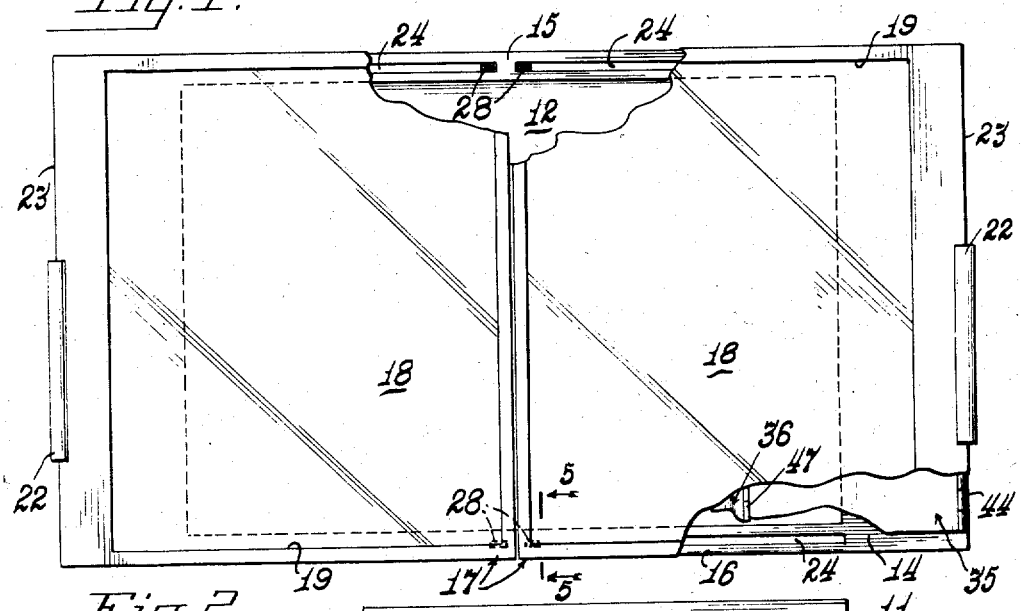
Fig. 1 is a front elevational view of a bathroom medicine cabinet embodying the present invention, showing portions broken away to illustrate the structure thereof.

Referring particularly to the accompanying drawing, the bathroom cabinet selected for purpose of illustration comprises a substantially rectangular sheet metal body 11, defining an enclosure having a rectangular opening 12 communicating with the interior thereof, through a front wall 13 comprising substantially rectangular vertically disposed side panels 14 and connecting top and bottom strips 15 and 16, respectively. Except as indicated hereinabove the specific construction of the cabinet per se is immaterial and no attempt has been made to illustrate its construction in complete detail.

Cabinets of this character are provided with a pair of closures or doors 17, preferably of a combined size and shape that correspond to the size and shape of the cabinet front wall, so as to overlie and conceal the same when the doors are in their closed position. Each of the doors preferably includes a mirror 18 and a marginal retaining frame 19.

Figure 5:
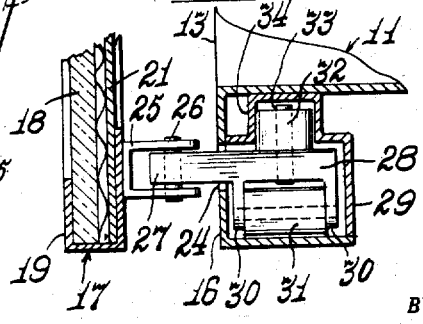
Fig. 5 is a [fragmenetary] *fragmentary* detail sectional view taken on line 5—5 of Fig. 1 and showing the slidable mounting.

Each door 17 preferably has a reinforcing back wall 21, as best illustrated in Fig. 5, which wall also has its marginal edges embraced within the U-shaped cross section of the retaining frame 19 and a handle 22 is provided along one vertical edge 23 of each of the doors 17.

Figure 2:
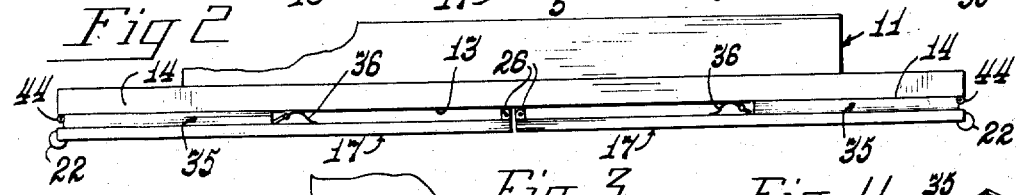
Fig. 2 is a plan view of the cabinet showing both doors in closed position.
Figure 3:
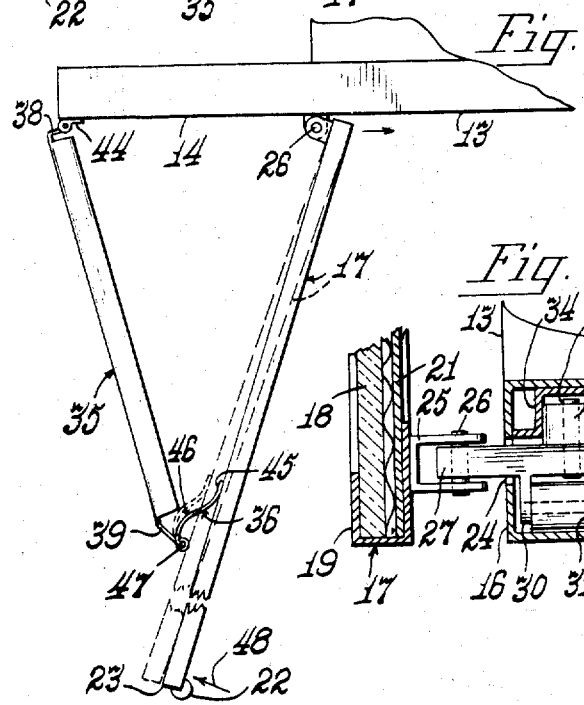
Fig. 3 is an enlarged top plan view of a fragment of the cabinet showing one of its doors in fully open position.

The doors 17 are mounted on the front of the cabinet 11 in such a manner that when one of the handles 22 is engaged and pulled outwardly in a direction substantially perpendicular to the plane of the cabinet front wall 13, the related door will move from the closed position shown in Fig. 2, there is a fully open position perpendicularly inclined relative to the plane of the front wall 13, as shown in full lines in Fig. 3. This manner of opening the door locates the mirror 18 in a position that permits it to be used at all times as distinguished from the opening of doors mounted in a [convenient] *conventional* manner which, when moved into open position, conceal the mirror from view.

In order to accomplish the above described movement of the door 17 and to facilitate the initial movement of the door from its fully opened position toward a closed position, said door is mounted for slidable hinging movement relative to the cabinet front wall in a manner now to be described: Inasmuch as the construction, mounting and operation of each of the doors 17 are identical, the following description will concern itself with the mounting of one of the doors only, it being understood that the description is equally applicable to both doors and their mounting.

The door 17 has one of its vertical edges pivotally and slidably mounted on the front wall of the cabinet. To this end the front faces of the top and bottom strips 15 and 16 of the cabinet 11 are each provided with slideways or tracks comprising slots 24 that extend a distance corresponding substantially to but less than the width of the door 17.

Referring generally to Fig. 2 and specifically to Fig. 5, it will be observed that the back face of the door 17 is provided adjacent one vertical edge thereof and close to the top and bottom edges with like bifurcated brackets 25. Each bracket is hingedly connected, by means of a pin 26, to a lug 27 formed as an integral part of a slide bracket 28. The bracket 28 is mounted within a guide channel defined by the front wall of the cabinet and a backing strip 29, with the lug portion 27 projecting outwardly through the slot 24. The bracket 28 includes a pair of ears 30 between which is journaled a roller 31 having rolling engagement with the bottom wall of the channel assembly. Said bracket also has, extending in the opposite direction, a roller 32 mounted thereon by means of a pin 33. This roller operates in a channel portion 34 so as to provide, in conjunction with the roller 31, an anti-friction slidable mounting for the bracket 28 which will absorb all vertical and lateral thrusts and minimize frictional resistance to free sliding of the bracket 28 longitudinally the length of the slot 16. One vertical edge of the door 17 is thus hingedly connected on a first vertical axis for reciprocal horizontal movement across the cabinet opening.

Figure 4:
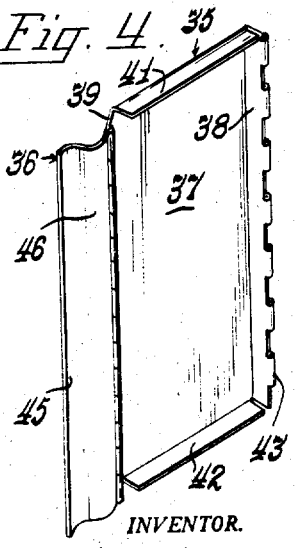
Fig. 4 is a perspective view of the hinge element.

In addition to the above described slidable-hinge mounting for one vertical edge of the door, said door is also hingedly connected to the cabinet in a manner best illustrated in Fig. 3. As shown, this hinge connection includes a substantially rectangular link member 35 of stiff sheet material and a spring means preferably in the form of a resiliently yieldable bracket 36. The member 35 may be substantially flat. However, for a purpose to become apparent presently, it preferably is shaped substantially as illustrated in Fig. 4, where it will be observed, it is substantially box-like in its construction, including a panel 37, an end wall 38 arranged perpendicularly to the panel and an opposite inclined wall 39. The top and bottom margins of the panel 37 are bent substantially at right angles thereto in the direction of the end walls 38 and 39 to provide top and bottom wall portions 41 and 42 respectively. The free edge of the perpendicular end wall 38 is suitably rolled, as at 43, to provide one element of a piano hinge, which cooperates with a complementary hinge element 44 secured firmly to the face of the related end panel 14, adjacent its outermost vertical[,] edge. In this manner the member 35 is hingedly connected *for a substantial distance* along one of its vertical edges to the front wall of the cabinet 11, to provide a second vertical axis.

The resiliently yieldable bracket 36 is fabricated from a strip of spring steel and it includes an attaching margin 45, which is secured firmly in a suitable manner to the back face of the reinforcing wall 21 on the door intermediate between the vertical edges of said door.

As shown in Fig. 2 of the drawing, the attaching margin 45 of each of the resiliently yieldable brackets 36 is secured to its respective door 17 at a point inwardly of the center of the door 17. That is, the distance between the axis of pin 26 and the attaching margin 45 is less than the distance between the attaching margin 45 and the handle 22 on edge 23 of the door 17. As a result, the moment arm between handle 22 and margin 45 is greater than the moment arm between the axis of pin 26 and margin 45. It has been found that this arrangement greatly facilitates the closing of the door 17 in that it reduces considerably the manual force required to be exerted on the door edge 23 for initiating the closing movement of the doors. The major portion 46 of said resiliently yieldable bracket 36 curves away from the back face of the door and then inwardly and terminates at its free edge in a complemental hinge part that cooperates with a corresponding hinge part on the free edge of the inclined end wall 39 of the hinge element 35 to provide a hinge connection, as at 47, joining the member 35 to the resiliently yieldable bracket 36 on a third vertical axis.

When the door is in the closed position illustrated in Fig. 2, the hinge element 35 lies in a plane parallel to the front surface of the cabinet front wall 13 with the door 17 lying thereover. The top and bottom walls 41 and 42 of said hinge element function to stiffen the panel 37 and to close the gap between the front face of the cabinet and the back face of the door 17. *The stiffness of panel 37 forces the entire door to pivot as an integral member with no likelihood of uneven movement of top and bottom edges. Thus there will be less tendency for the brackets 25 to twist and brackets 28 to bind.* When the door 17 is in the fully opened position illustrated in full lines in Fig. 3, said door is disposed perpendicularly inclined relative to the cabinet front wall but in an opposite direction, to the angle of the hinge element 35, thus forming a triangle having as its sides, the hinge element 35, the door 17 and the cabinet panel 14. In the absence of the yielding effect of spring means 36, considerable difficulty would be *in some instances* encountered in seeking to move the door from its fully opened position into a closed position by reason of the frictional resistance offered by the slide brackets 28 and further because of the resistance offered by the hinge element 35 which is opposed to the direction of movement required of the door while initially moving it into closed position.

In order to start the door moving from its fully open position, as shown in Fig. 3, into a closed position it is necessary to apply force manually against the front face of the door adjacent its free edge 23. The initial application of force in the general direction of the arrow 48 moves the door from the full line position shown in Fig. 3 into substantially the dotted line position there illustrated. Such movement is attained by hinge movement of the door about the first vertical axis 26 while the slide bracket 28 frictionally resists initial sliding movement. Rocking movement of the door 17 about the axis of pin 26 from the full line position of the door into its dotted line position, without perceptible movement of the hinge element 35, is obtained by reason of the resiliently yieldable bracket 36 which flexes from the full line position shown into the dotted line position illustrated. When the door is in its dotted line position the angle of the door relative to the plane of the front wall of the cabinet is reduced sufficiently to overcome the inherent resistance of the slide elements 28 so as to cause the door to move easily into a full closed position upon continued application of force at the door edge 23. Following this initial cycle of movement, the energy stored up in the resiliently yieldable bracket 36 is released to assist the door in its closing movement and restore the bracket to its initial position.

In order to open the door 17, the handle 22 on the free vertical edge thereof is engaged and pulled outwardly substantially perpendicularly to the plane of the cabinet front wall, thus carrying the door 17 and the hinge element 35 into the fully open positions illustrated.

It is believed that my invention, its mode of construction and assembly, and many of its advantages should be readily understood from the foregoing without further description, and it should also be manifest that while a preferred embodiment of the invention has been shown and described for illustrative purposes, the structural details are nevertheless capable of wide variation within the purview of my invention as defined in the appended claims. *For example, certain features of the invention do not require the connection between door 17 and link 35 to be resiliently yieldable.*

What I claim and desire to secure by Letters Patent of the United States is:

1. In a cabinet including an enclosure having an opening lying in a vertical plane, a vertically disposed door, a link member, means pivotally connecting one end of the link member to the enclosure, and means slidably mounting an edge portion of said door to said enclosure for horizontal reciprocal movement of said door edge portion in a plane parallel to the plane of said opening, said slidable mounting means frictionally resisting initial sliding movement when the door is in an open position, said mounting means including means pivotally connecting said door edge portion to said enclosure for relative pivotal movement of said door about a vertical axis, said door and said link member extending outwardly from the enclosure when the door is in an open position, the improvement comprising resilient means yieldably connecting the other end of said link member to said door, said other end of the link member and said door being otherwise unconnected and freely movable with respect to each other except for the connection by and effect of said resilient means, whereby an inward closing thrust exerted on the door when the latter is in its open position will cause said resilient means to yield due to the frictional resistance of said slidable mounting means so as to allow the door to pivot inwardly about said vertical axis before said door edge portion commences sliding movement toward a closed position and whereby said resilient means will store the initial energy of said inward closing thrust and then subsequently impart said energy to aid in moving the door toward said closed position after said edge portion commences said sliding movement.

2. A cabinet as recited in claim 1 wherein said resilient means comprises a resiliently yieldable bracket member, said door having a mirror on the front face thereof, said bracket member having one end thereof secured to the rear face of said door, and means pivotally connecting the other end of said bracket member to said other end of said link member.

3. A cabinet comprising an enclosure having an opening lying in a vertical plane, a vertically disposed door, a link member, means pivotally connecting one end of the link member to the enclosure, means slidably mounting an edge portion of said door to said enclosure for horizontal reciprocal movement of said door edge portion in a plane parallel to the plane of said opening, said slidable mounting means frictionally resisting initial sliding movement when the door is in an open position, said mounting means including means pivotally connecting said door edge portion to said enclosure for relative pivotal movement of said door about a vertical axis, said door and said link member extending outwardly from the enclosure when the door is in an open position and resilient means yieldably connecting the other end of said link member to said door and responsive to an inward closing thrust exerted on the door, when the latter is in open position, for allowing the door to pivot inwardly about said vertical axis through a predetermined angular displacement due to the frictional resistance of said slidable mounting means before said door edge portion commences sliding movement toward its closed position and for storing the initial energy of said inward closing thrust and for subsequently imparting said energy to aid in moving the door toward said closed position after said edge portion commences said sliding movement, said resilient means being connected to said door at a point thereon closer to said vertical axis than to the edge portion of said door opposite said first-recited edge portion.

*4. A pivotal-sliding door cabinet comprising an enclosure having a vertical front wall and means defining an opening in said front wall comprising bottom and top horizontal framing members and at least one interconnected vertical framing member, a vertically disposed door for said enclosure adapted to move between two positions, one of which is a position parallel with and overlying the front wall and closing off at least a portion of said opening, and the other of which is a position in which the plane of said door is vertical and forms an angle with the plane of said front wall, a pair of horizontal concealed guide means provided in said cabinet at the top and bottom thereof, forwardly opening slots provided in said respective bottom and top framing members providing access to said guide means from said front wall, a slide confined in each of said guide means and each slide having a link member extending forward of said guide means through the respective slots, said link members being pivotally connected respectively at the top and bottom of said door adjacent one vertical edge thereof and defining a first vertical axis about which said one vertical edge is adapted to swing with sliding movement of said slides while said vertical edge is translated horizontally parallel with said horizontal framing members, a third link member in the form of an elongate plate having a hinged connection with said vertical framing member to define a second vertical axis to enable swinging of said third link member, said third link member having another hinged connection with the rear of said door and defining thereby a third vertical axis, said third vertical axis being disposed between said one vertical edge of said door and the opposite vertical edge, the said opposite vertical edge being free and adapted to be manually moved to pivot said door about said third vertical axis while moving said door between said positions.*

*5. A cabinet as claimed in claim 4 in which said third vertical axis is located closer to said one vertical edge of said door than to said opposite vertical edge thereof to provide a greater moment arm in moving said door from said other to said one position.*

*6. A cabinet comprising an enclosure having a front vertical wall with an opening framed by framing members at least on the top, bottom and one vertical side thereof, a vertical door adapted to move between one position overlying the said opening parallel with said front wall and a second position at an angle with said front vertical wall, the top and bottom framing members having internal concealed slideways formed therein with concealed slides confined by and movable along said slideways, forward opening substantially horizontal slots in said top and bottom framing members, there being rigid extensions of said slides protruding through said slots and confined against vertical movement by said slots, one vertical edge of said door being pivotally secured and supported at its top and bottom to the respective extensions, a single stiff plate-like link member hingedly connected by one vertical edge thereof along a substantial length of said side framing member and making an elongate hinged connection along its opposite vertical edge with the back of said door along a line located adjacent the center of said door parallel with said one vertical edge of said door, the opposite vertical edge of said door being free and adapted to be manually pushed to open and close said door, said slots being of equal lengths less than the width of said door and limiting the sliding movement of said door from said first to said second positions whereby said link member and that portion of said door between said vertical line and said one vertical edge of said door form an acute angle at said second position, while permitting said link member to be sandwiched between said door and front wall and be completely concealed thereby at said one position, said link member resisting twisting and consequent binding of said door during its movement.*

*7. A cabinet as claimed in claim 6 in which said link*

*member is of a shallow box-like configuration having substantially right-angle flanges along at least three edges thereof whereby to additionally stiffen said link member and maintain parallel spacing between said door and said front wall at said one position.*

*8. A cabinet as claimed in claim 6 in which said slideways comprise tracks having top and bottom internal bearing surfaces, and said slides each comprises a rigid bracket mounting top and bottom anti-friction means engaged with said bearing surfaces respectively.*

References Cited in the file of this patent or the original patent

UNITED STATES PATENTS

| | | |
|---|---|---|
| 120,580 | Fowzer | Nov. 7, 1871 |
| 393,934 | Talbott | Dec. 4, 1888 |
| 580,426 | Rux | Apr. 13, 1897 |
| 746,758 | Stiggleman | Dec. 15, 1903 |
| 1,368,127 | Ellison | Feb. 8, 1921 |
| 1,776,464 | Blackman | Sept. 23, 1930 |
| 1,920,898 | Soule | Aug. 1, 1933 |
| 2,150,321 | Ferris | Mar. 14, 1939 |
| 2,602,969 | Wieland | July 15, 1952 |
| 2,746,829 | Spillane | May 22, 1956 |

FOREIGN PATENTS

| | | |
|---|---|---|
| 30,846 | France (1st addition to No. 586,490) | June 15, 1926 |
| 439,357 | Great Britain | Dec. 2, 1935 |
| 559,661 | Germany | Sept. 23, 1932 |
| 621,616 | Germany | Nov. 11, 1935 |